(12) United States Patent
Kupisiewicz

(10) Patent No.: US 6,639,178 B2
(45) Date of Patent: Oct. 28, 2003

(54) METHOD FOR LOCALLY REMOVING A COAT APPLIED ON A TRANSLUCENT OR TRANSPARENT SUBSTRATE

(75) Inventor: Axel Kupisiewicz, Tilff (BE)

(73) Assignee: Wallonia Space Logistics, en Abrege WSL, Societe Anonyme, Angleur (BE)

(*) Notice: Subject to any disclaimer, the term of this patent is extended or adjusted under 35 U.S.C. 154(b) by 4 days.

(21) Appl. No.: 10/169,766
(22) PCT Filed: Jan. 17, 2001
(86) PCT No.: PCT/BE01/00010
§ 371 (c)(1),
(2), (4) Date: Jul. 22, 2002
(87) PCT Pub. No.: WO01/53011
PCT Pub. Date: Jul. 26, 2001

(65) Prior Publication Data
US 2003/0075531 A1 Apr. 24, 2003

(30) Foreign Application Priority Data
Jan. 20, 2000 (BE) .............................. 20000037

(51) Int. Cl.⁷ ................................................ B23K 26/36
(52) U.S. Cl. ............................................. 219/121.69
(58) Field of Search ........................ 219/121.6, 121.68, 219/121.69, 121.83, 121.85

(56) References Cited

U.S. PATENT DOCUMENTS

| 5,235,154 A | * | 8/1993 | Economikos |
| 5,958,268 A | * | 9/1999 | Engelsberg et al. |
| 5,986,234 A | * | 11/1999 | Matthews et al. |

FOREIGN PATENT DOCUMENTS

| DE | 197 15 702 | * | 10/1998 |
| FR | 2 760 986 | * | 9/1998 |

* cited by examiner

Primary Examiner—Samuel M. Heinrich
(74) Attorney, Agent, or Firm—Bacon & Thomas, PLLC

(57) ABSTRACT

Process for the local removal of a coating (2), consisting of at least one metallic layer and/or at least one metal-oxide layer, applied on a translucent or transparent substrate (1) made of natural or synthetic glass or of transparent plastic, characterised in that, by means of a solid-state pulse laser (4) or at least one pulsed laser diode, a pulsed laser beam (3) whose pulse is inferior to the 30 ns and whose wave length(s) is/are comprised between 10 micrometers and 360 nanometers is directed onto the coating (2) to those spots where the latter has to be removed, whereby the applied wave lengths are such that the absorption of the substrate (1) and of the coating (2) as a whole is less than 30%.

21 Claims, 3 Drawing Sheets

METHOD FOR LOCALLY REMOVING A COAT APPLIED ON A TRANSLUCENT OR TRANSPARENT SUBSTRATE

The present invention concerns a process for the local removal of a coating, also called-"covering" consisting of at least one metallic layer and/or at least one metal-oxide layer, applied on a translucent or transparent substrate made of natural or synthetic glass or of transparent plastic.

By "covering" is understood any coating composed of one or several layers lending particular optical, electromagnetic or thermal qualities to the substrate.

Such coatings are often applied onto glass, for example for wind screens, often in one or several layers which are so thin that they are translucent or transparent.

Said coatings are usually vacuum applied and over the entire surface of the material. For many applications, the material must be stripped in particular spots, for example on the contour.

This local removal is necessary, for example to recover the original qualities of the material in view of a better adhesion if the glass is to be glued, in view of an electric insulation if the coating is conductive, in view of recovering the initial transparency in case of a non-transparent coating etc.

At present, the local removal of a coating is done by means of chemical or mechanical methods.

However, these techniques imply chemical pollution, and they can attack the surface or even damage the material itself.

Said removal of the coating can be avoided by applying the coating only to the desired spots by means of a masking technique.

However, it is not always possible to use such a technique, among others in the case of masks having a complex shape or representing interrupted and enclosed parts.

Moreover, the transitions between the coated parts and the non-coated parts are often of bad quality.

The cost of the masks is often prohibitive, especially if they need to be replaced for each different localisation of the non-coated parts.

The invention aims to provide a process for the local removal of a coating, applied on a translucent or transparent substrate, which avoids said disadvantages and which, as a result, is economical, does not include any risk of damaging the substrate, allows for a localisation with great precision and a transition between the coated and non-coated parts of an excellent quality (with a border of even less than 25 micrometers), and makes it possible to restore the original physical qualities of the substrate there where the coating has been removed.

According to the invention, said aim is reached by means of a process according to which, by means of a solid-state pulse laser or at least one pulsed laser diode, a pulsed laser beam whose wave length(s) is/are comprised between 10 micrometers and 360 nanometers is directed onto the coating to the spots where the latter has to be removed, whereby the applied wave lengths are such that the absorption of the substrate and of the coating as a whole is less than 30%.

It is already known to use a laser for the selective removal of layers in the coating process of the semiconductor industry, as well as for the removal of oxides from metallic surfaces.

In these cases, use is made of a gas laser. Such a type of laser cannot be used for transparent materials which, if their initial physical qualities are to be restored, do not tolerate that any compounds of the layers are diffused inside the material, and which only endure feeble increases in temperature.

U.S. Pat. No. 5,235,154 for example, concerns the production of integrated circuits and semiconductors, and describes a process which makes it possible to repair interruptions in circuits consisting of two metallic layers, applied on an insulating organic layer, for example made of polyamide, covering in turn the insulating substrate, made of glass for example. The parts to be replaced of the metallic layers are successively eliminated by means of evaporation with the help of a pulsed laser, after which the removed part is sealed again with a chemical coating in the shape of vapour. Only small surfaces are laser-treated, and the preservation of the optical qualities of the substrate cannot be guaranteed. Moreover, the whole is not transparent or translucent.

The process according to the invention makes it possible to preserve the optical qualities of the translucent or transparent substrate. Moreover, it can be applied to a substrate/coating as a whole which may have a light transmittance of more than 80%.

U.S. Pat. No. 5,958,268 describes a selective ablation process of unwanted materials, for example the ablation of oxides from a metal substrate, the ablation of silicon from a quartz substrate or the ablation of paint from a metal substrate. The ablation is obtained thanks to the combined effect of an inert gas, thrust onto the surface to be treated, and a laser beam of energetic photons.

It is necessary to use photons which are sufficiently energetic, i.e. with an energy comprised between 7 and 22 eV, which restricts the choice of the laser. Preference is given to a UV laser, for example a gas laser of the KrF type whose wave length is 248 nm and which allows for a photonic energy of 5 eV.

The above-described process does not allow for the selective removal of the coating from a transparent, relatively thick substrate made of glass or plastic, such as a wind screen, as it would result in the substrate being heated and the creation of micro-cracks, or as it would be inefficient due to the absorption of the energetic photons.

According to the invention, a solid-state laser having wave lengths between 10 micrometers and 360 nanometers is used, for example an Nd:YAG laser, whose photons only amount to 1.167 eV or 2.32 eV when being duplicated. The risk of damaging a chemical compound with this type of laser, producing photons which are little energetic, is very small.

DE-A-197 15 702 describes an ablation process of one or several layers by means of a self-regulating laser. According to this process, the ablation is brought about by means of a laser having such a wave length that the laser beam is absorbed by the coating to such an extent that the ablation level of the material of said coating is exceeded, whereas this level is not reached in the substrate. The optimal wave length is selected as a function of the absorption of the coating and of the substrate, whereby the relation of the absorption to the efficiency of the ablation is well known. In order to be able to better produce the optimal wave length, use is made of a laser with an optical parametric oscillator (OPO). As the alignment of the elements is very difficult and the operational stability requires an environment which is little aggressive, lasers with an OPO are practically useless outside the lab.

As the above-mentioned process is based on the absorption of the wavelength of the beam by the coating, the absorption of the wavelength of the beam must be significant and considerably different from that of the substrate.

According to the invention, the aforesaid is not required. The absorption of the coating with the used wave lengths may be feeble, even less than 10%, and the absorption of the transparent or translucent substrate may differ but only little from that of the coating. A mere observation of the spectrometric qualities of the coating and of the substrate will not be sufficient to meet the required efficiency and quality demands for, for example, the ablation of the layer or layers in order to reduce the thermal radiation emitted or transmitted by a wind screen, a car window or the window of a building.

According to the invention, a beam with a pulse lower than 30 ns and a wavelength which is preferably situated between 1,200 nanometers and 400 nanometers is preferably directed onto the coating.

The pulse laser beam can be sent through an optical imaging system and/or a diaphragm to improve the quality of the transition between the covered and noncovered surfaces.

The pulse laser beam is optimally directed onto the coating through the substrate.

For a better understanding, some forms of embodiment of a process for the local removal of a coating applied on a translucent or a transparent substrate according to the invention are described as an example only without being limitative in any way, with reference to the accompanying drawings, in which.

Figure 7:
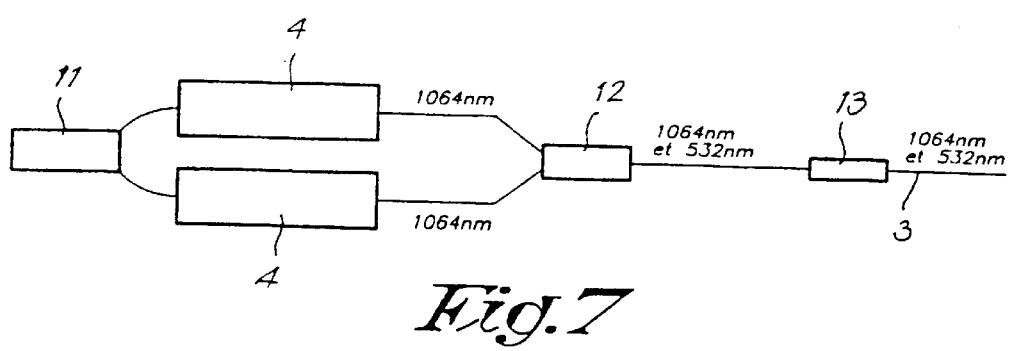
Figure 8:
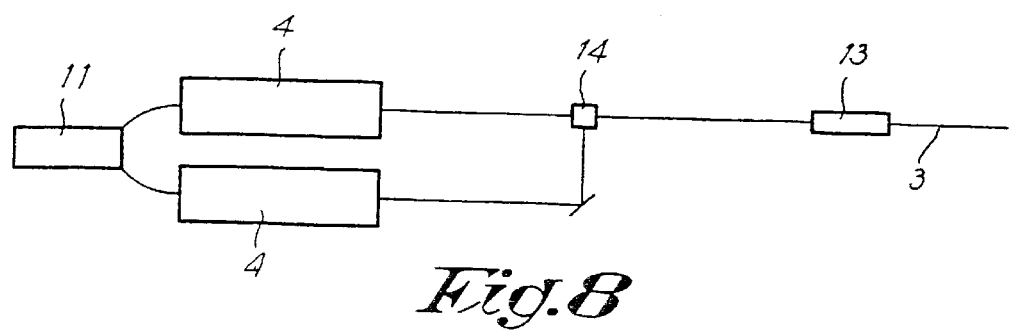
Figure 9:
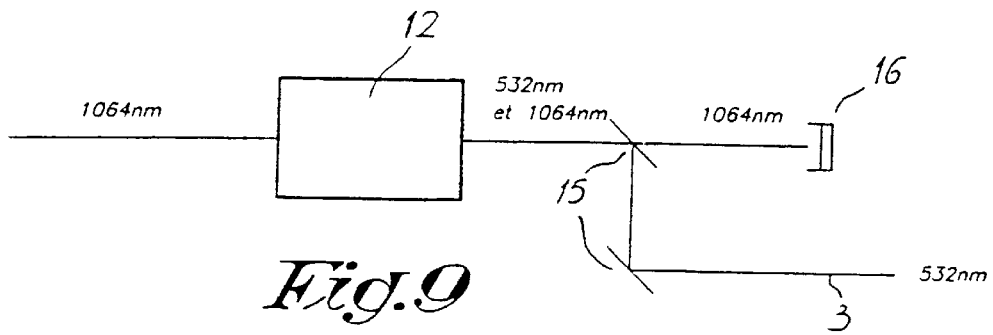
Figure 10:
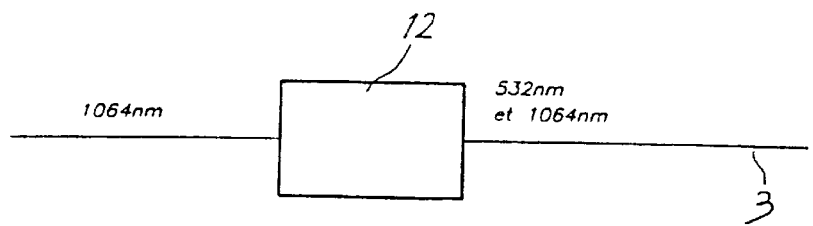

FIG. 7 schematically represents a device which can be used to apply the process according to the invention, but with reference to another embodiment of the process;

FIG. 8 schematically represents a device which can be used to apply the process according to the invention, but with reference to yet another embodiment of the process;

FIG. 9 represents a device which can be used to apply the process according to to invention, but with reference to another embodiment of the process;

FIG. 10 shows an alternate embodiment of the device shown in FIG. 9; and

Figure 11:
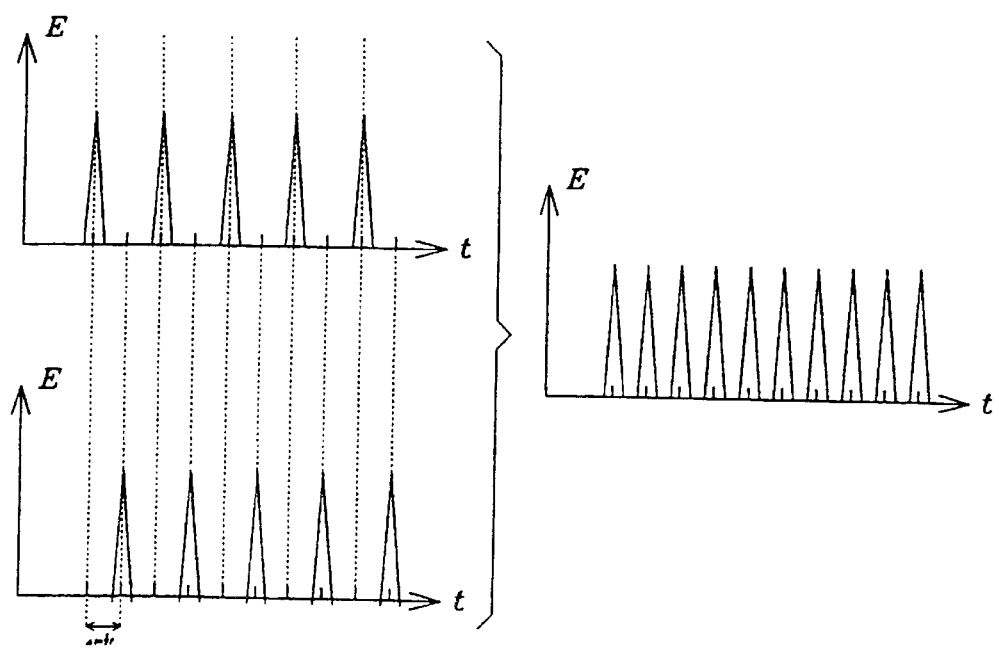

FIG. 11 represents an alternate embodiment of the process according to the invention.

Figure 1:
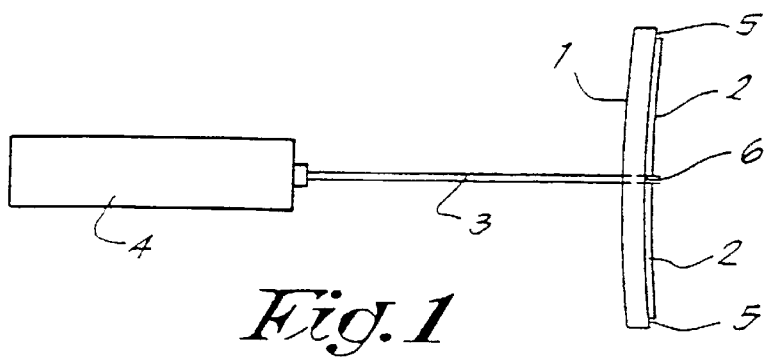
FIG. 1 is a schematic representation of a substrate made of glass during the local removal of its coating by means of the process according to the invention.

FIG. 1 schematically represents a substrate 1 made of glass, in the given example the glass of a wind screen of a car, which has been coated over its entire surface by a coating 2 which is locally removed according to the invention by means of a pulse laser beam 3 directed onto the coating 2 by a solid-state pulse laser 4.

The total absorption of the substrate 1 and of the coating 2 as a whole is in the given example less than 30% for the wavelengths of the laser 4, which implies that the coating 2 is also little absorbent and thus transparent or translucent.

The coating 2 comprises several layers of which at least one is a metallic coating, guaranteeing that the coating 2 is electrically conductive.

Figures 5, 6:
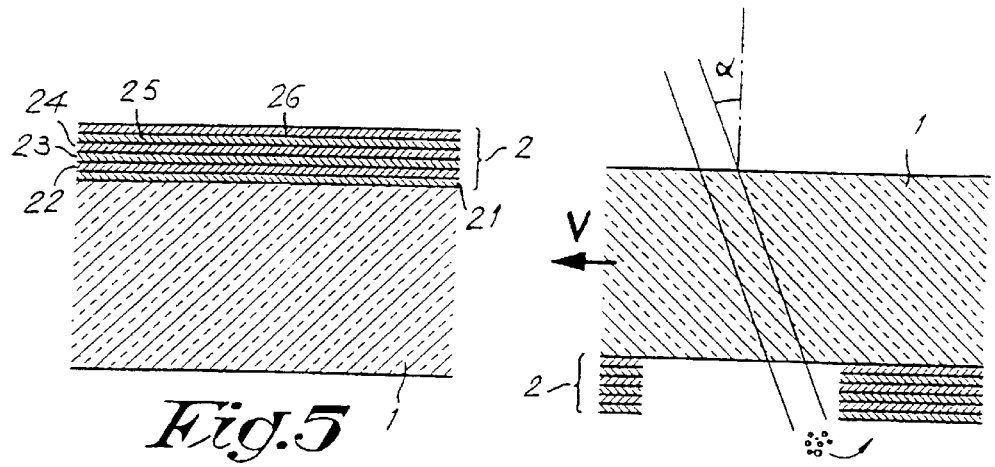
FIG. 5 represents a section of a substrate and its coating to which the process according to the invention is applicable.
FIG. 6 represents a section of the substrate and its coating during the application of the process, to a larger scale.

Another example is represented in detail in FIG. 5. The coating 2 comprises a number of superimposed layers having a thickness of a few nanometers or micrometers and which are thus transparent, i.e. at least a first layer of zinc oxide 21, a silver layer 22, a second and a third layer of zinc oxide 23 and 24, a second silver layer 25 and a fourth layer of zinc oxide 26. This coating makes it possible to diminish the thermal radiation transmitted by the glass substrate 1.

In the given example, the coating 2 must be removed from a zone 5 around the substrate 1 to make it adhere better, and locally from a zone 6 in the middle so as to obtain a non-conductive zone, while a visual transmission in conformity with the required specifications is guaranteed. Of course, other configurations for the parts of the coating to be removed are possible.

Figure 2:
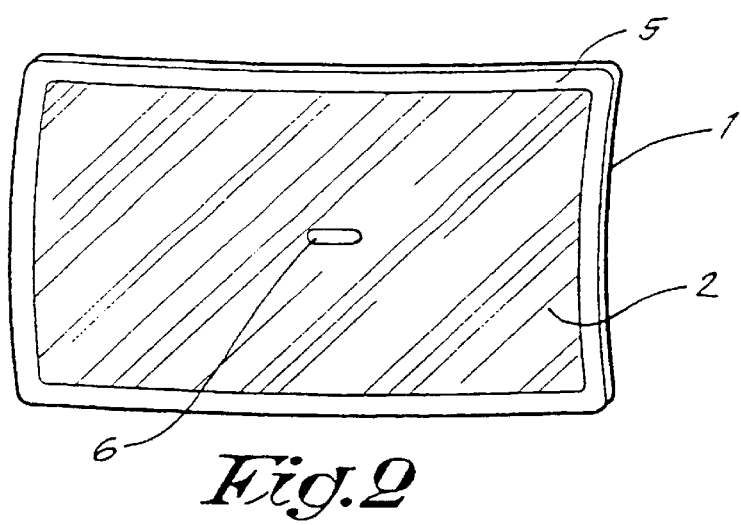
FIG. 2 is a front view of a substrate of which part of the coating has been removed according to the invention.

In FIG. 2, the substrate 1 is represented after the coating 2 has been locally removed from the zones 5 and 6.

The laser 4 being used is a solid-state laser, for example a laser of the type:YAG, preferably an Nd:YAG laser with short pulses, in particular having a length of less than 30 ns, and better still of less than 10 ns.

According to variants, also other types of pulse lasers are possible, such as for example a laser 4 of the type Nd:Glass, for example Nd:YLF.

The pulse energy and the wave length are optimised as a function of the nature of the coating 2 and of the substrate 1.

The use of wave lengths for the laser beam 3 in the near-infrared and the visible spectrum, i.e. wave lengths situated between 10 micrometers and 360 nanometers, and preferably between 1,200 nanometers and 400 nanometers, allows for an efficient transmission of the energy of the laser 4 through the substrate 1 made of glass, thus avoiding that any possible heating might cause unwanted diffusions of the material of the coating 2 in the substrate 1 or micro-cracks being formed in the substrate 1 due to thermal stress.

As the impact surface of the beam 3 is much smaller than the zones 5 and 6, the beam 3 must undergo a relative movement in relation to the substrate 1, whereby this movement is preferably controlled by a programmable microprocessor.

Figure 3:
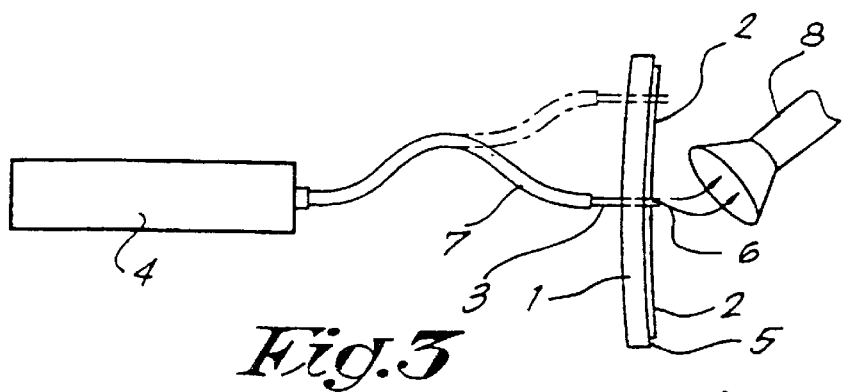
FIGS. 3 and 4 are schematic views similar to those in FIG. 1, but with reference to other embodiments of the process according to the invention.

This can be done, either by maintaining the laser 4 in a fixed place and by making the substrate 1 move, or by keeping the substrate 1 still and by moving the laser 4, or also by merely moving the beam 3, for example by means of a mirror system or an optical fibre 7 as represented in FIG. 3.

The substrate 1 can be made to move by means of a transport table or a turntable, upon which the coated substrate is placed and which is set in motion, controlled by a microprocessor, in relation to the laser beam.

The removal speed can be increased by sending the pulses of the laser 4 through the substrate 1. This is not due to a rise in temperature of the substrate 1, as the latter absorbs only very little luminous energy of the laser 4, but it is partly due to the fact that the particles of the coating 2 which are set free by the beam are thrust into space and not towards the substrate 1. The speed vector of the ejection of the compounds, even gaseous, follows the same direction as the incident beam.

The angle of incidence $\alpha$ in relation to the normal of the beam is situated between 5° and 35°, such that the residues thrust by the beam are ejected on the side which has not been scoured yet by the sweeping laser, as is represented in detail in FIG. 6, which allows for a maximum restriction of unwanted metallic ions being diffused in the substrate 1. In said FIG. 6, the direction of the relative movement of the substrate 1 in relation to the beam 3 is indicated by the arrow V.

The embodiment of the process with reference to FIG. 3 differs from the above-described embodiment, not only in that an optical fibre 7 is used to guide the beam 3, but also in that the particles which are set free by the beam 3 are sucked in by a suction device 8. This can increase the removal speed and restricts the diffusion of unwanted metallic ions in the substrate 1 to a minimum.

The quality of the removal and the interface between the non-coated zones 5 and 6 and the coated parts can be improved by making use of an optical imaging system and/or a diaphragm.

Figure 4:
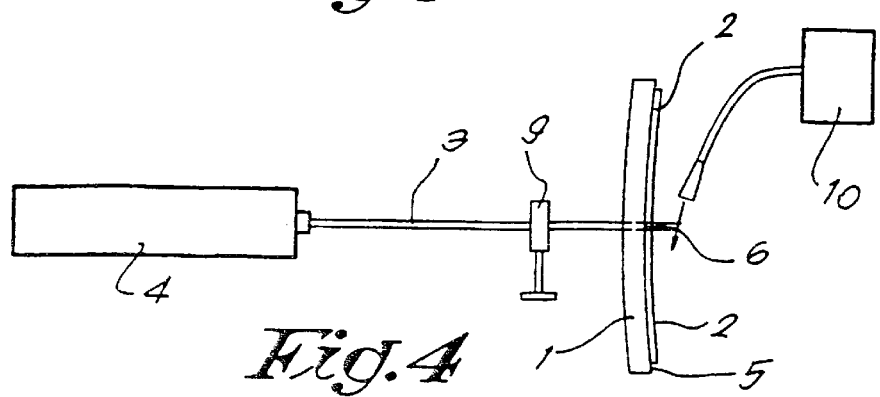

FIG. 4 refers to an embodiment of the process according to which a diaphragm 9 is used, whereby this diaphragm is positioned in front of the laser 4. This is due to the fact that the diaphragm 9 cuts the edges of the spatial profile of the laser beam, making them more pronounced.

Further, a gas, for example an inert gas or compressed air produced by a compressor 10, is directed to the place of impact of the beam 3 on the coating 2. This can increase the removal speed.

The laser 4 is a solid-state, flashlamp-pumped laser or diode-pumped laser. According to a variant, the solid-state laser 4 can be replaced by one or several pulsed laser diodes, provided they are strong enough.

The laser 4 can also be coupled to a harmonic generator, for example a frequency duplicator 12, such that the wave length of the beam 3 is half the wave length of the laser 4, which makes it possible to increase the quality of the removal.

The harmonic generator is then used in a normal manner, i.e. generating as many harmonics as possible and filtering the fundamental wave length by means of two dichroic mirrors 15 and a light trap 16, as represented in FIG. 9.

Said harmonic generator can also be used by modifying the "phase-matching" of the crystal and by eliminating the dichroic mirrors (FIG. 10), in order to simultaneously use the harmonics and the fundamental with different energy densities, thus allowing to make optimal use of the laser energy and to thus increase the removal speeds with a factor 2 to 5, as well as the scouring quality. For example, the "phase-matching" of the duplicator 12 can be voluntarily disturbed so as to obtain a proportion of 60% of near-infrared and 40% of the visible spectrum in the outgoing beam 3, as a result of which the removal speeds can be increased.

The beam 3 can also be modified by means of an optical imaging system.

The optical system cuts the edges of the intermediate energy beam, thus avoiding partial combustions or homogenising the beam in the application zone. Also other processes for improving the profile of the beam, such as the use of an imaging system or a homogeniser, make it possible to restrict the negative effects of the residual particles by preventing partial combustions or unwanted reactions of the particles which are found in the plasma.

The part of the energy of the beam 3 which is not absorbed by the coating is either transmitted or reflected by the latter. These transmitted and reflected beams can be recovered by a mirror system and sent back to the coating to be removed. This complementary optical system makes it possible to increase the removal speed with a factor 2.

Instead of a single laser 4, two identical lasers 4 with a frequency f and a wave length λ are used, for example of 1064 nm for Nd:YAG, whereby one of the lasers 4 is controlled by the other by means of a synchronisation box 11, so that the shot of the latter laser 4 is temporally offset with a factor f/2. Both beams are recombined in a duplicator 12, which makes it possible to generate an outgoing beam comprising two wavelengths (for example 532 nm and the fundamental at 1064 nm), followed by an imaging system 13, as is schematically represented in FIG. 7, or in a polariser 14, as is schematically represented in FIG. 8.

The system will thus emit a beam 3 with a virtual frequency of 2f. FIG. 11 shows the pulses of two lasers 4 with a frequency f, whereby the second laser 4 is controlled by the other, and the pulses of the virtual laser with a frequency 2f, obtained after recombining the beams of the lasers 4 in a duplicator 12 or in a polariser. This system is advantageous as far as the occupied volume of the system is concerned, as well as the quality of the useful beam for the scouring. An increase of the frequency of the system does not result in a degradation of the spatial profile of the beam 3, as opposed to when the frequency of a single laser with an identical pulse energy is increased. With a few adjustments, the system could also use n identical lasers with a frequency f so as to obtain an outgoing beam 3 with a virtual frequency nf.

In all the above-described embodiments, the process according to the invention may comprise in the end, i.e. after the local scouring, a curing of the substrate 1 and of the non-removed coating 2 at more than 100° C., preferably at more than 600° C.

This curing allows the last residues, left on the substrate 1 after the actual scouring, to evaporate or to diffuse in a homogenous manner in the substrate 1. Another effect is that the traces on the surface resulting from the excited particles of the plasma, for example metallic ions, are homogenised.

The longer the length of the curing cycle and the higher the temperature, the more particles will migrate and become diffused over the entire thickness of the substrate 1.

Such curing is already applied in the production of wind screens in order to bulge the glass; as a result, it should not be considered as a supplementary phase in the present application.

Thanks to the curing, the process can be accelerated as restrictions related to too high concentrations of residual particles diffused on the surface are diminished thanks to the diffusion of these particles over the entire thickness of the substrate 1, finally resulting in a very low concentration, whereby the particles become invisible.

The majority of the elements of the multi-layered coating 2 is eliminated. Thanks to the evaporation or diffusion of these elements during the scouring and curing, the substrate regains its initial transparency.

The curing makes the process 5 to 10 times more efficient than a process without curing.

The glass of the substrate 1 can be natural glass, such as the glass of a wind screen, of a car window or of the window for a building, as well as synthetic glass or transparent plastic, such as PET.

After being scoured according to the invention, such a plastic layer can be sandwiched between two glass sheets or between a glass sheet and a plastic sheet, for example PVB. Scouring is also possible when the PET sheet is put directly on a layer of glass or PVB.

The substrate 1 may be the glass of a bottle, for example a perfume or a liquor bottle, whereby the coating 2 may have a decorative nature, and the local removal of this coating is meant to provide some relief or to make special designs for technical or commercial purposes.

In all these embodiments, the parts of the coating 2 are removed with precision, in a fast, simple manner, without damaging the substrate 1.

Very neat borders can be made, even with a width of less than 0.01 mm.

The process allows for much flexibility as far as the creation of designs is concerned. The selective removal can be carried out on a contour, for example, so as to prevent corrosion from spreading inside a window screen, or on local surfaces in order to put sensors in them, for example rain sensors, bar codes to identify the window screen, or also scoured zones required for telepayment systems.

The design can also be applied by means of a mask upon which is engraved the design to be made. This mask, which is swept by the laser beam 3, can be provided between the laser 4 and the substrate 1 in order to prevent the mask from being soiled by the projected residues.

The quality, the efficiency and the flexibility of the above-mentioned process are due to complex interactions between the photothermal and photoacoustic phenomena and the creation of a plasma by the scouring, resulting from the selection of the laser 4, the wave lengths, the length of the pulses and other measures to avoid any degradation of the substrate 1 by excited residues. The photons interact with the coating 2, but not with the substrate 1.

The combination of the above-mentioned phenomena allows for the sublimation of the coating 2 or the ejection of this coating 2 in the shape of fine particles.

There where the coating 2 has been removed, the substrate 1 represents its original physical qualities again, i.e. it will be translucent or transparent as before it was coated, and it will be non-conductive, even though the coating 2 is conductive.

As a result, the process is particularly useful for the local removal of coatings from substrates 1 which have to preserve their optical qualities.

The process makes it possible to locally scour a coating 2 which is little absorptive to the used wave lengths, on a substrate 1 which is also little absorptive to the above-mentioned wave lengths, whereby the absorption of the substrate and coating as a whole amounts to less than 30%.

This does not mean that the process cannot be used to remove an opaque coating 2 from the substrate 1, for example a black one (black print), for example to remove the print mark from a window screen.

The above-described process results in a gain of a factor 10 to 100 in relation to the use of a laser without any special precautions. The installation costs of a system for the local removal of coatings applying the process according to the invention can be compared to or are inferior to those of a conventional mechanical or chemical technology. With a laser 4 having an average output of hardly 50W (for example 1 Joule rated at 50 Hz) it is possible to remove 10 m²/h of a multi-layered coating 2 to reduce the thermal radiation, what is called "coating low-e".

What is claimed is:

1. Process for the local removal of a coating (2), consisting of at least one metallic layer and/or at least one metal-oxide layer, applied on a translucent or transparent substrate (1) made of natural or synthetic glass or of transparent plastic, characterised in that, by means of a solid-state pulse laser (4) or at least one pulsed laser diode, a pulsed laser beam (3) whose pulse is inferior to 30 ns and whose wave length(s) is/are comprised between 10 micrometers and 360 nanometers is directed onto the coating (2) to those spots where the latter has to be removed, whereby the applied wave lengths are such that the absorption of the substrate (1) and of the coating (2) as a whole is less than 30%.

2. Process according to claim 1, characterised in that a beam (3) with a pulse of less than 10 ns is directed onto the coating (2).

3. Process according to claim 1, characterised in that a laser beam (3) is directed onto the coating whose wave length(s) is/are situated between 1,200 nanometers and 400 nanometers.

4. Process according to claim 1, characterised in that the angle of incidence α of the beam (3) in relation to the normal is situated between 5° and 35°, whereby the sweeping direction of she beam is such that the residues thrust at the angle α are deposited on the part which is still coated.

5. Process according to claim 1, characterised in that the beam (3) of the pulsed laser (4) is sent onto the coating (2) through an optical imaging system.

6. Process according to claim 1, characterised in that the beam (3) of the pulsed laser (4) is sent onto the coating (2) through a diaphragm (9).

7. Process according to claim 1, characterised in that the beam (3) of the pulsed laser (4) is directed onto the coating (2) through the substrate (1).

8. Process according to claim 1, characterised in that a laser (4) of the type YAG, for example an Nd:YAG laser, or of the type Nd :Glass, for example an Nd: YLF laser, either flashlamp-pumped or diode-pumped, is used.

9. Process according to claim 1, characterised in that the laser (4) is completed by a harmonic generator, for example a frequency duplicator.

10. Process according to claim 1, characterised in that the laser (4) is completed by a harmonic generator and an optical system in order to simultaneously use the harmonics and the fundamental with different energy densities.

11. Process according to claim 1, characterised in that two identical lasers (4) of the same frequency are used, one of which is controlled by the other by means of a synchronisation box (11), so that the shot of the latter laser (4) is temporally offset with a factor 1/2f, after which both laser beams are combined in a frequency duplicator (12) or in a polarise (14).

12. Process according to claim 1, characterised in that the coating (2) is locally removed from a substrate (1) consisting of a wind screen or a car window, the window of a building or the glass of a bottle.

13. Process according to claim 1, characterised in that the beam (3) is guided by at least one optical fibre (7).

14. Process according to claim 1, characterised in that a gas under pressure is directed to the place of impact of the beam (3) on the coating (2).

15. Process according to claim 1, characterised in that there is a suction at the place of impact of the beam (3) on the coating (2).

16. Process according to claim 1, characterised in that the substrate (1) is subjected to a relative movement in order to determine the shape of the coating to be removed.

17. Process according to claim 1, characterised in that by locally removing the coating with the laser beam (3), the original physical qualities of the substrate (1) as it was before being coated are reestablished.

18. Process according to claim 1, characterised in that the coating (2) is locally removed in such a manner that the substrate (1) recovers its initial optical qualities.

19. Process according to claim 1, characterised in that the coating (2) is locally removed in such a manner that the transition between the covered parts and the non-covered parts of the coating (2) is clear, whereby the borders are even narrower than 10 micrometers.

20. Process according to claim 1, characterised in that the energy of the beam (3) which is not absorbed by the coating (2) is recovered by a mirror system and is sent back to the coating (2) to be removed.

21. Process according to claim 1, characterised in that the substrate (1) is cured in the end, together with what remains of the coating (2), at more than 100° C., preferably at more than 600° C.

* * * * *